3,480,656
N-TIN CARBAMIC ACID DERIVATIVES
Herbert L. Heiss, New Martinsville, W. Va., assignor to Mobay Chemical Company, Pittsburgh, Pa., a corporation of Delaware
No Drawing. Continuation-in-part of application Ser. No. 381,240, July 8, 1964. This application Mar. 18, 1969, Ser. No. 808,334
Int. Cl. C07f 7/22
U.S. Cl. 260—429.7           9 Claims

ABSTRACT OF THE DISCLOSURE

N-tin carbamic acid derivatives are prepared by reacting organic isocyanates with organic compounds containing at least one tin to oxygen bond, the product containing tin, nitrogen, carbon, hydrogen and oxygen atoms and the nitrogen is present only as part of a carbamyl moiety.

---

This application is a continuation-in-part of application Ser. No. 381,240 filed July 8, 1964 and now abandoned.

This invention relates to organotin compounds and to a method for preparing the same. More particularly, it relates to organotin compounds having tin to nitrogen bonds.

It is an object of this invention to provide organotin compounds having tin to nitrogen bonds. It is another object of this invention to provide a method for preparing such compounds. It is still another object of this invention to provide organotin compounds useful as catalysts for the NCO-active hydrogen reaction and for polymerizing isocyanates.

The foregoing objects and others which will become apparent from the following description are accomplished in accordance with the invention, generally speaking, by providing organotin compounds having tin to nitrogen bonds by reacting an organotin compound having at least one tin to oxygen bond with an organic isocyanate.

It is generally known that organic isocyanates react with compounds containing active hydrogen atoms as determined by the Zerewitinoff method. However, it would not be expected that isocyanates react with organic compounds which contain tin to oxygen bonds.

The organic isocyanate attacks the bond joining a tin atom with an oxygen atom. For example, when one mol of phenyl isocyanate is reacted with bis(tributyl tin)oxide, the equation is as follows:

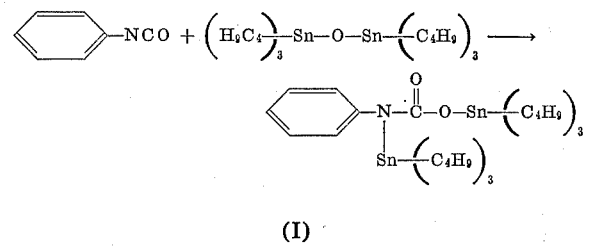

(I)

When an additional mol of phenyl isocyanate reacts with the product as shown above, a further reaction takes place with the remaining tin to oxygen bond in accordance with the following equation.

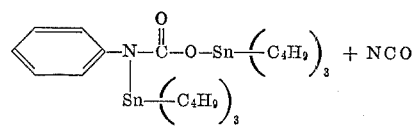

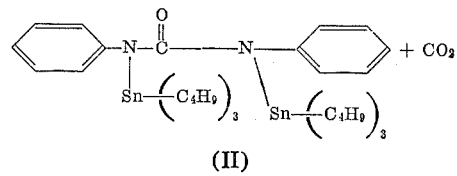

(II)

Thus, the particular isocyanate may be used in a deficiency, in an equivalent amount with respect to the number of tin to oxygen bonds or an excess. When the isocyanate is polyfunctional and the tin compound contains more than one tin to oxygen bond, higher polymers form.

No particular reaction conditions are necessary in order to conduct the stated reaction. The reaction proceeds quite readily at room temperature and is generally exothermic. However, when the tin compound contains two tin atoms attached to the same oxygen atom, such as in bis(tributyltin)oxide, the second mol of phenyl isocyanate reacts with the liberation of $CO_2$ and with substantially no exotherm such as that observed for the addition of the first mol of phenyl isocyanate.

Any suitable organo-tin compound containing at least one tin to oxygen bond and containing at least six carbon atoms may be used such as, for example, tin oxides having the formula

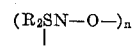

and $R_3Sn-O-SnR_3$, tin hydroxides, having the formula $R_2Sn(OH)_2$ and $R_3Sn-OH$; tin compounds having organic radicals bonded to tin through oxygen such as tin alkoxides and phenates including the compounds having the formulas $R_3SnOR$, $R_2Sn(OR)_2$; $RSn(OR)_3$, $Sn(OR)_4$ and $Sn(OR)_2$; tin carboxylates such as those having the formulas

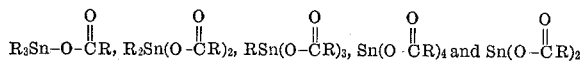

and the like. In all of the formulas set forth, R can be alkyl, such as, for example, methyl, ethyl, propyl, butyl, pentyl, hexyl, octyl, decyl, hexadecyl, octadecyl and the like; aralkyl such as, for example, benzyl, phenylethyl, naphthylmethyl, phenylbutyl, phenylpropyl, phenylisopropyl, phenylbutyl, phenylisobutyl, naphthylisobutyl and the like; aryl such as, for example, phenyl, naphthyl and the like; alkaryl such as, for example, tolyl, ortho-, meta- and para-xylyl, ethylphenyl, hexylphenyl, nonylphenyl and the like. Specific compounds within the formulas set forth above include triethyltin hydroxide, dihexyltin hydroxide, tributyltin hydroxide, trioctadecyltin hydroxide, dimethyltin diacetate, diethyltin diacetate, dibutyltin diacetate, dioctyltin diacetate, dilauryltin diacetate, dibutyltin dilaurate, dibutyltin maleate, dibutyltin dimethoxide, dibutyltin dibutoxide, butyltin triacetate, dipropyltin oxide,

(in which $x$ is a positive integer), bis(tripropyltin)oxide, dihexyltin oxide, bis(triethyltin)oxide, dibutyltinoxide, bis-(tributyltin)oxide, dioctyltin oxide, dilauryltinoxide, bis-(tribenzyltin)oxide, diallyltinoxide, diphenyltinoxide, bis-(triphenyltin)oxide,

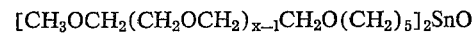

$[CH_3OCH_2(CH_2OCH_2)_{x-1}CH_2O(CH_2)_5]_2SnO$ (in which the $x$'s are positive integers), dibutyltin basic laurate and dibutyltin basic hexoxide, tributyltin ethoxide, tributyltin hexoxide, trioctadecyltin butoxide, dubutyltin dibutoxide, tributyltin methoxide, tributyltin butoxide, dilauryltin diethoxide, butyltin triethoxide, tolyltin tripropoxide, monobutyltin triethoxide, tributyltin acetate, butyltin triacetate, tributyltin monophenate, dibutyltin di-2-ethylhexoate, tributyl-2-ethylhexoate, tin tetraethoxide, stannous propoxide, dibutyltin diacetate, butyltin triacetate, monobutyltin tri-2-ethylhexoate; stannous propionate, stannic acetate, stannous laurate, stannous-2-ethyl hexoate, stannous octoate, stannous oleate, tributyltin propionate, octadecyltin tripalmitate, butyltin tri-o-phenylphenate and the like. It is preferred that the tin compounds are liquid below 100° C. The tin compound may contain up to about 80 carbon atoms. It is preferred that the tin compounds contain from 6 to 40 carbon atoms.

Any suitable organic mono- or polyisocyanate may be used such as, for example, methylisocyanate, ethylisocyanate, propylisocyanate, isopropylisocyanate, allylisocyanate, butylisocyanate, isobutylisocyanate, sec. butylisocyanate, tert. butylisocyanate, amylisocyanate, 3-methoxypropylisocyanate, tetradecylisocyanate, chlorodecylisocyanate, 4 - oxahexadecylisocyanate, 4 - oxa - 6 - butyldodecylisocyanate, dodecylisocyanate, hexadecylisocyanate, octadecylisocyanate, 1 - isocyanato-octadecene - 9, phenylisocyanate, cyclohexylisocyanate, o - chlorophenylisocyanate, m - chlorophenylisocyanate, p - chlorophenylisocyanate, o - toluylisocyanate, m - toluylisocyanate, p-toluylisocyanate, o - ethylphenylisocyanate, o - ethoxyphenylisocyanate, p - ethoxyphenylisocyanate, 1 - isocyanato - 3 - benzalacetophenone, 1 - isocyanatosulfonyl - 4 - methylbenzene, benzylisocyanate, m - isocyanato - cinnamicacidethylester, 2,4-dichlorophenylisocyanate, 3,4 - dichlorophenylisocyanate, 2,5 - dichlorophenylisocyanate, α - naphthylisocyanate, β - naphthylisocyanate, 5-hydroxy-α-naphthylisocyanate, 5-isocyanato-α-naphthylchloroformate, o-biphenylisocyanate, o-phenoxyphenylisocyanate, tetramethylene diisocyanate, hexamethylene diisocyanate, 1,4-phenylene diisocyanate, 1,3-phenylene diisocyanate, 1,4-cyclohexylene diisocyanate, 2,4-tolylene diisocyanate, 2,5-tolylene diisocyanate, 2,6-tolylene diisocyanate, 3,5-tolylene diisocyanate, 4-chloro-1,3-phenylene diisocyanate,
1-methoxy-2,4-phenylene diisocyanate,
1-methyl-3,5-diethyl-2,6-phenylene diisocyanate,
1,3,5-triethyl-2,4-phenylene diisocyanate,
1-methyl-3,5-diethyl-2,4-phenylene diisocyanate,
1-methyl-3,5-diethyl-6-chloro-2,4-phenylene
  diisocyanate,
p-xylylene diisocyanate,
m-xylylene diisocyanate,
4,6-dimethyl-1,3-xylylene diisocyanate,
1,3-dimethyl-4,6-bis-(β-isocyanatoethyl)benzene,
3-(α-isocyanatoethyl)phenylisocyanate,
1-methyl-2,4-cyclohexylene diisocyanate,
4,4'-biphenylene diisocyanate,
3,3'-dimethyl-4,4'-biphenylene diisocyanate,
3,3'-dimethoxy-4,4'-biphenylene diisocyanate,
3,3'-diethoxy-4,4'-biphenylene diisocyanate,
1,1'-bis-(4-isocyanatophenyl)cyclohexane,
4,4'-diisocyanatodiphenylether,
4,4'-diisocyanato-dicyclohexylmethane,
4,4'-diisocyanatodiphenylmethane,
4,4'-diisocyanato-3,3'-dimethyldiphenylmethane,
4,4'-diisocyanato-3,3'-dichlorodiphenylmethane,
4,4'-diisocyanato-diphenyldimethylmethane,
1,5-naphthylene diisocyanate,
4,4',4''-triisocyanato-triphenylmethane,
2,4,4'-triisocyanato-diphenylether,
2,4,6-triisocyanato-1-methyl-3,5-diethylbenzene
and the like.

In addition to organotin compounds containing Sn—O bonds, isocyanates will react with other metal compounds containing metal to oxygen bonds such as titanium compounds including tetrabutyl titanate, phosphorous compounds such as tributyl phosphite, boron compounds such as trimethoxy boroxine and the like. The reaction of the organic isocyanates with the organic tin compounds containing at least one tin to oxygen bond results in the preparation of N-tin carbamic acid derivatives containing tin, nitrogen, carbon, hydrogen and oxygen atoms wherein the nitrogen is present only as part of a carbamyl

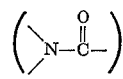

moiety. The tin compounds prepared in accordance with this invention are useful as catalysts in the production of urethane polymers by the polyaddition reaction of isocyanates with active hydrogen compounds, as fungicides, vinyl stabilizers and accelerators of NCO polymerization reactions and also as intermediates in the preparation of other organotin compounds.

The invention is further illustrated but not limited by the following examples in which parts are by weight unless otherwise specified.

Example 1

To about 595 parts of bis(tributyltin)oxide is added 119 parts of phenyl isocyanate. The reaction is highly exothermic and no gas evolution is observed. The product is an amber viscous fluid. The structure I set forth above is confirmed by both infrared analysis and by nuclear magnetic resonance for proton types.

Example 2

The procedure of Example 1 is conducted, however, 238 parts of phenyl isocyanate are added. This is equivalent to the number of Sn—O bonds present in the bis(tributyltin)oxide. Again, a high exotherm is observed. This exotherm corresponds to the addition of the first phenyl isocyanate molecule to the tin compound. The reaction mixture is maintained at about 140° C. at which temperature considerable $CO_2$ is evolved. Infrared and nuclear magnetic resonance establishes a product II above.

Example 3

To about 327 parts of tributyltin butoxide is added about 107 parts of phenyl isocyanate. A moderate exotherm is observed. The reaction vessel is then heated to a temperature of about 144° C. for about one hour. An amber fluid indicated by infrared to have the structure

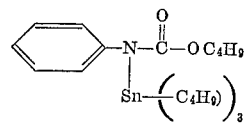

results.

Example 4

About 8 mols of phenyl isocyanate are added to about one mole of bis(tributyltin)oxide and the mixture is maintained at about 140° C. The structure indicated in Example 2 results with the excess of isocyanate being converted to the corresponding isocyanurate. This observation is in accordance with previously observed reactions wherein tin compounds cause the trimerization of isocyanates.

Example 5

To about 327 parts (0.9 mol) of tributyltin butoxide are slowly added about 107 parts (0.9 mol) of phenyl isocyanate in a closed system equipped with a stirrer, a heating mantel, a dropping funnel and a reflux condenser. The heat of reaction drives the temperature to about 122° C. During the next hour, the temperature is increased to 144° C. No gas is evolved. The product, an amber fluid, gives an IR curve in agreement with the proposed structure:

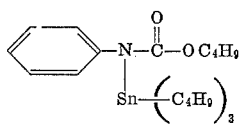

*Analysis.*—Calculated: C, 53.0%; H, 10.0%; O, 4.4%; Sn, 32.6%. Found: C, 53.9%; H, 9.6%; O, 0%; Sn, 29.0%.

Example 6

About 35.5 parts (0.5 mol) ethyl isocyanate are added slowly to about 297.5 parts (0.5 mol) bis(tributyltin) oxide. Cooling is required to keep the temperature below the boiling point of the ethyl isocyanate. After the addition of the ethyl isocyanate is completed, the temperature is gradually increased to about 140° C. At the end of about 1½ hours, the product is a clear amber fluid. The weight loss due to gas evolution is only 1.0 part. Infrared indicates no free NCO groups.

Example 7

The procedure of Example 6 is followed except about 71.0 parts (1.0 mol) of ethylisocyanate are used. Slow gas evolution as the temperature approaches 140° C. is observed. After about 2 hours at about 140° C. the weight loss is 12.2 parts. The product is a brown fluid containing traces of triethyl isocyanurate as a byproduct. Infrared indicates no free NCO groups.

Example 8

About 59.5 parts (0.5 mol) of phenyl isocyanate are added to about 351 parts (1.0 mol) of dibutyltin diacetate. This reaction differs from the previous examples in that it is much less exothermic and immediate gas evolution occurs.

The weight loss is about 22.5 parts (0.5 mol $CO_2$) and the product is a brown liquid consisting of the structure

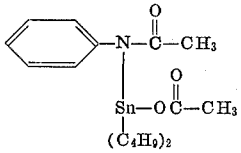

and unreacted dibutyltin diacetate. Some acetanilide is also formed.

Example 9

About 59.5 parts (0.5 mol) of phenyl isocyanate are added to about 170.5 parts (.25 mol) of stannous oleate. Reaction is similar to Example 8. The weight loss is 20.1 parts (0.46 mol $CO_2$). The product is a brown fluid and contains no free NCO groups.

Example 10

About 595 parts of bis(tributyltin)-oxide (1 mol) are added to about 174 parts of 2,4-tolylene diisocyanate (1 mol). The reaction proceeds exothermically at first and then is continued with heating for about 6 hours at about 120° C. Carbon dioxide is evolved. The product is a viscous amber fluid having substantially no free NCO groups.

It should be understood that the scope of the invention is not to be limited by the specific examples presented herein but that any of the tin compounds and isocyanates set forth above can be reacted to prepare organotin compounds containing tin to nitrogen bonds in accordance with this invention.

Although the invention has been described in considerable detail in the foregoing for the purpose of illustration, it is to be understood that such detail is solely for this purpose and that variations can be made by those skilled in the art without departing from the spirit and scope of the invention.

What is claimed is:
1. As a new composition of matter, a N-tin carbamic acid derivative containing tin, nitrogen, carbon, hydrogen and oxygen atoms wherein the nitrogen is present only as part of a carbamyl moiety, said composition of matter prepared by the process which comprises reacting an organic isocyanate with an organic compound containing at least one tin to oxygen bond.
2. The composition of claim 1 wherein the organic isocyanate is monofunctional.
3. The composition of claim 1 wherein the organic isocyanate is polyfunctional.
4. The composition of claim 1 wherein the organic compound containing at least one tin to oxygen bond is a stannous carboxylate.
5. The composition of claim 1 wherein the organic compound containing at least one tin to oxygen bond is a stannic carboxylate.
6. The composition of claim 1 wherein the N-tin carbamic acid derivative has the formula

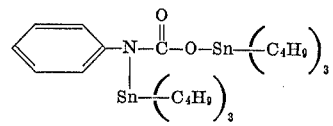

7. The composition of claim 1 wherein the N-tin carbamic acid derivative has the formula

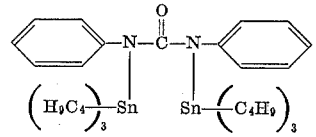

8. The composition of claim 1 wherein the N-tin carbamic acid derivative has the formula

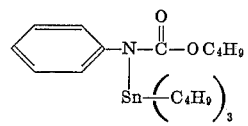

9. The composition of claim 1 wherein the N-tin carbamic acid derivative has the formula

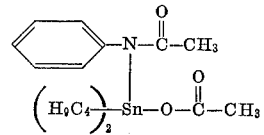

References Cited

UNITED STATES PATENTS 3,053,871    9/1962    Aries _____ 260—429.7 X
3,347,890    10/1967    Davies _____ 260—429.7 X

OTHER REFERENCES

Bloodworth: Chemical Society Proceedings, (1963), p. 264.

TOBIAS E. LEVOW, Primary Examiner

WERTEN F. W. BELLAMY, Assistant Examiner

U.S. Cl. X.R.

252—431